(12) United States Patent
Moursund et al.

(10) Patent No.: US 7,228,123 B2
(45) Date of Patent: Jun. 5, 2007

(54) METHOD AND SYSTEM FOR AUTOMATICALLY DETERMINING LINES OF SIGHT BETWEEN NODES

(75) Inventors: Carter Moursund, San Diego, CA (US); Lorenzo Caminiti, Pasadena, CA (US); Enrico Di Bernardo, Pasadena, CA (US); Luis Goncalves, Pasadena, CA (US)

(73) Assignee: Clearmesh Networks, Inc., Pasadena, CA (US)

( * ) Notice: Subject to any disclaimer, the term of this patent is extended or adjusted under 35 U.S.C. 154(b) by 613 days.

(21) Appl. No.: 10/802,405

(22) Filed: Mar. 17, 2004

(65) Prior Publication Data

US 2004/0248521 A1 Dec. 9, 2004

Related U.S. Application Data

(62) Division of application No. 10/153,878, filed on May 24, 2002, now Pat. No. 6,771,932.

(51) Int. Cl.
*H04B 5/00* (2006.01)

(52) U.S. Cl. .............. 455/411; 370/469; 370/316; 370/328

(58) Field of Classification Search ................ 382/154, 382/100, 106; 455/41.1, 517, 63.1, 67, 421, 455/423, 513, 514, 151.2; 370/316, 328; 398/130, 154; 702/5, 36
See application file for complete search history.

(56) References Cited

U.S. PATENT DOCUMENTS 4,807,202 A    2/1989   Cherri et al. ............... 367/129
5,062,150 A   10/1991   Swanson et al. ............ 359/152
5,257,285 A   10/1993   Thorp ......................... 375/11
5,257,405 A   10/1993   Reitberger ................. 455/54.1
5,329,395 A    7/1994   Endo et al. ................. 359/159
5,475,520 A   12/1995   Wissinger ................... 359/172

(Continued)

FOREIGN PATENT DOCUMENTS

GB          2111270           6/1983

OTHER PUBLICATIONS

Jungnickel, V., et al., "Wireless Infrared Communication using Adaptive Arrays", *4th ACTS Mobile Summit*, vol. 2, Sorrento, Italy, (1998),979-984.

(Continued)

*Primary Examiner*—Samir Ahmed
(74) *Attorney, Agent, or Firm*—Christie, Parker & Hale, LLP

(57) ABSTRACT

The present invention uses data from several sources to determine lines-of-sight between nodes in a FSO network. The present invention provides a three-dimensional neighborhood modeling system that uses aerial image data, Digital Elevation Models, U.S. street map data and address data to automatically map the placement of nodes within a neighborhood or other geographical area.

Method for creating the 3-Dimensional, House and Tree Maps used in the line-of-sight processing are also disclosed. A House Map in the present invention identifies houses in an area of consideration, and a Tree Map in the present invention identifies trees in an area of consideration. A 3-Dimensional Map in the present invention provides an elevation for every pixel for the area under consideration, whereby the elevation is adjusted for the height of trees, houses and other objects.

2 Claims, 11 Drawing Sheets

U.S. PATENT DOCUMENTS

| | | |
|---|---|---|
| 5,631,653 A | 5/1997 | Reedy |
| 5,737,690 A | 4/1998 | Gutman .................... 340/7.54 |
| 5,877,490 A | 3/1999 | Ramer et al. ............ 250/206.1 |
| 5,983,068 A | 11/1999 | Tomich et al. ................ 455/3.1 |
| 5,999,299 A | 12/1999 | Chan et al. ................ 359/172 |
| 6,049,593 A | 4/2000 | Acampora ................ 379/56.2 |
| 6,070,051 A | 5/2000 | Astrom et al. ............ 455/12.1 |
| 6,104,981 A | 8/2000 | Louis et al. .................... 702/5 |
| 6,297,897 B1 | 10/2001 | Czichy et al. ............. 359/172 |
| 6,314,163 B1 | 11/2001 | Acampora ................ 379/56.2 |
| 6,323,980 B1 | 11/2001 | Bloom ...................... 359/159 |
| 6,947,451 B1* | 9/2005 | Dommety et al. .......... 370/328 |
| 2002/0005972 A1 | 1/2002 | Bloom et al. ............... 359/172 |
| 2002/0051269 A1 | 5/2002 | Margalit et al. ............ 359/172 |
| 2002/0054411 A1 | 5/2002 | Heminger et al. .......... 359/159 |
| 2002/0054413 A1 | 5/2002 | Shivnan ...................... 359/172 |
| 2003/0152045 A1* | 8/2003 | Martin ...................... 370/328 |

OTHER PUBLICATIONS

Pakravan, M.R., et al., "Indoor Wireless Infrared Channel Characterization by Measurements", *IEEE Transaction*, vol. 50, Issue 4, (Jul. 2001), 1053-1073.

Yoon, T., et al., "622 Mbit/s CMOS limiting amplifier with 40dB dynamic range", *Electronics Letters*, vol. 32, No. 20, (Sep. 26, 1996), 1920-1922.

* cited by examiner

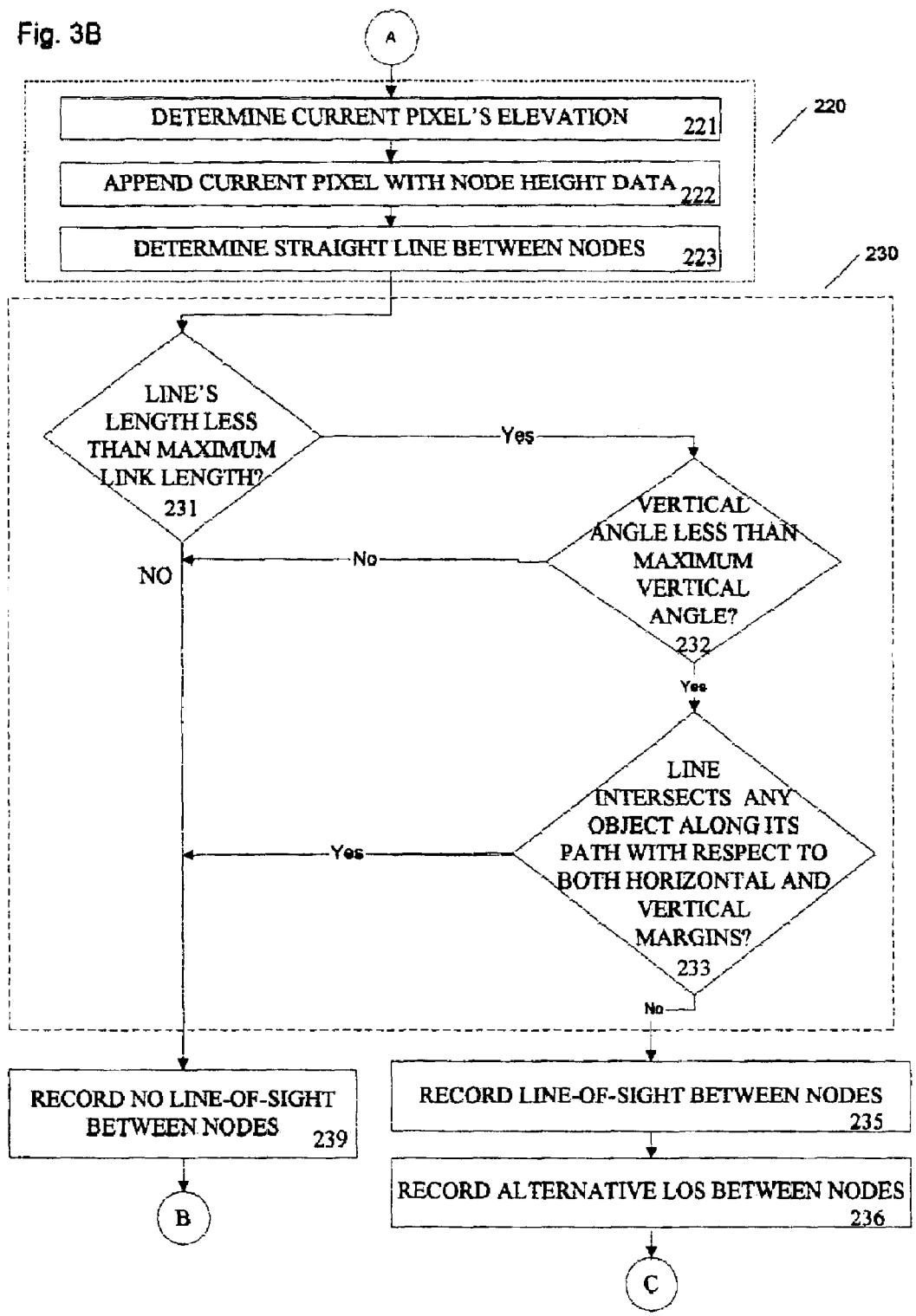

METHOD AND SYSTEM FOR AUTOMATICALLY DETERMINING LINES OF SIGHT BETWEEN NODES

This application is a divisional of U.S. patent application Ser. No. 10/153,878, filed May 24, 2002 now U.S. Pat. No. 6,771,932, which is incorporated herein by reference.

FIELD OF THE INVENTION

The present invention relates generally to wireless networks and more particularly to a method for determining lines of sight between two noes in a wireless infrared mesh network.

BACKGROUND OF THE INVENTION

In many areas of the world the World Wide Web (WWW), or Internet, has become a significant medium for the exchange of information including everything from casual electronic mail (e-mail) to legal and business documents to entertainment media. Much of the material exchanged over the Internet comprises very large electronic files, for example large documents, music, video and even full-length motion pictures are available for exchange and distribution over the Internet.

While commercial services often choose fast but expensive high-speed Internet connections for business purposes, consumer connections typically use relatively slow telephone modems. For example, a typical commercial T1 connection will yield in the range of 1,544 kilobits per second (Kbps) or 1.544 megabits per second (Mbps) data communications rate at a monthly cost in the range of $1,000 to $2,000. In contrast, a typical consumer telephone modem connection will provide a 56 Kbps data communications rate at a cost of in the range of $10–$30 month.

As commercial services provide richer content for consumer use, data file sizes increase. For example, a typical audio music file may be in the range of 3–5 Megabytes and take anywhere from 5 minutes to an hour for a consumer to download over a standard telephone modem. A typical audio/video file, for example, a full-length movie, may run in the thousands of mega bytes size range and take a significant part of a day for a consumer to download over a regular telephone modem. High-bandwidth applications such as on-demand television and Web pages filled with multimedia effects may be impossible to use with a standard telephone modem connection.

It is obvious that the ability of commercial services to provide rich, large media files is rapidly outstripping the typical consumer's ability to receive those files.

Recently, several affordable, high-speed alternatives have become available to the traditional telephone modem. Cable modems use the cable television infrastructure to provide Internet connections having a maximum speed of about 1,500 Kbps, over 25 times the speed of a telephone modem. DSL modems use conventional telephone lines to provide Internet connections also having a maximum speed of about 1,500 Kbps. Both cable and DSL modems are priced at approximately twice the cost of telephone modem services, with slightly higher costs for equipment.

The higher speed cable and DSL connections are geographically limited, however, by the underlying infrastructure. Many areas of the United States include regions not serviced by cable television or where the cable television network has not and will not be upgraded to support high-speed data modems. Similarly, DSL service is not available in many geographic areas. Numerous reasons exist for the limited availability of cable and DSL services, including high-cost of infrastructure upgrade, technological limitations, physical geographical limitations and, in some areas, low demand. As with many types of commercial services, the incremental costs of extending infrastructure become increasingly higher, sometimes by multiples or even exponentially, as attempts are made to expand those infrastructures to every last consumer.

There thus exists a real demand for high-speed Internet connections in areas that cable and/or DSL service providers may never serve. This demand will increase as more content is provided and more business is executed over the Internet.

Some providers have attempted to expand service coverage while avoiding the high costs associated with physically expanding the broadband network infrastructure. The ability to extend a network to individual businesses or homes that would not otherwise be able to be connected is called "Last-mile technology", which is basically the infrastructure at the neighborhood level. Last-mile technology carries signals from the broad telecommunications network along the relatively short distance to and from a home or business.

One method of accomplishing Last-mile technology is through use of a wireless network that extends from an access point in the wired infrastructure. Wireless networks may be installed without the need for the wired infrastructure. In a wireless network, electromagnetic waves, rather than some form of wire, carry the signal over part or all of the communication path.

One type of wireless technology uses radio frequency (RF) components to transmit data in the radio frequency spectrum. RF networks however cannot provide a level of security that is required by many broadband users. Another type of wireless network uses infrared (IR) devices to convey data via IR radiation.

Infrared radiation is electromagnetic energy at a wavelength or wavelengths somewhat longer than those of red light. The shortest wavelength IR borders visible red in the electromagnetic radiation spectrum, the longest wavelength IR borders radio waves. IR wireless systems implement devices that convey data through IR radiation.

IR systems typically operate in either "diffuse mode" or "line-of-sight" mode. In diffuse mode, the system can function when the source and destination are not directly visible to each other, e.g. a television remote. In line-of-sight (LOS) mode, there must be a visually unobstructed straight line through space between the transmitter and receiver. Unlike RF wireless links, IR wireless cannot pass through walls or other physical obstructions. However, unlike RF wireless links, a line-of-sight IR system offers a level of security comparable to hard-wired systems, due to the nature of the invisible and narrow beams used to connect a line-of-sight IR transmitter and receiver.

Free-space optics (FSO) refers to the transmission of modulated visible or infrared beams through the atmosphere to obtain broadband communications. Laser beams are generally used, although non-lasing sources such as light-emitting diodes (LEDs) or IR-emitting diodes (IREDs) may also be used. FSO works similarly to fiber optic transmission. The difference is that the energy beam is collimated and sent through clear air or space from the source to the destination, rather than guided through an optical fiber. At the source, the visible or IR energy is modulated with the data to be transmitted. At the destination, the beam is intercepted by a photodetector, the data is extracted from the beam (demodulated), and the resulting signal is amplified and sent to the hardware.

FSO systems can function over distances of several kilometers. As long as there is a clear line of sight between the source and the destination, communication is theoretically possible. Even if there is no direct line of sight, strategically placed mirrors can be used to reflect the energy.

Because air, not fiber, is the transport medium, FSO systems are cost-effective and easy to deploy. Unlike fiber, there are no heavy capital investments for buildout and there is no long provisioning delay to set up a FSO network. In addition, FSO works in an unregulated frequency spectrum with little or no traffic currently in this range. Another advantage to FSO networks is that FSO network architecture needn't be changed when other nodes are added; customer capacity can be easily increased by changing the node numbers and configurations.

However, for a number of reasons, FSO systems have generally not been used as a solution to the last-mile-access problem in the past. While lasers are a cost-effective high-speed communications medium, they require very highly aligned line-of-sight paths. More specifically, existing FSO systems have very narrow beam divergence parameters requiring precision alignment. For this reason, laser components tend to be expensive and laser systems tend to require high levels of maintenance and service. In addition, FSO systems can be limited by rain, dust, snow, fog or smog that can block the transmission path and shut down the network. Therefore, FSO deployments have been located relatively close to big hubs, which has heretofor limited the technology to customers in major cities.

There exists demand for high-speed, affordable Internet connections in geographics and neighborhoods into which more traditional, wired high-speed network infrastructure cannot be cost-effectively extended. This demand will grow significantly as the Internet is increasingly used to deliver content, facilitate business transactions and support other matters amenable to electronic data transfer. While FSO systems have been developed, significant obstacles have prevented widespread use of FSO systems to achieve last-mile access.

One significant obstacle to implementing FSO networks is the difficulty of setting up the IR nodes such that an unobstructed line-of-sight is achieved between nodes. The present invention is directed to a method and system for automatically determining line-of-sight between FSO nodes.

SUMMARY OF THE INVENTION

The present invention uses data from several sources to determine lines-of-sight between nodes in a FSO network. The present invention provides a three-dimensional neighborhood modeling system that uses aerial image data, Digital Elevation Models, U.S. street map data and address data to automatically map the placement of nodes within a neighborhood or other geographical area. While not thus limited, the network of the present invention can be cost-effectively extended to many areas not supporting traditional wired network infrastructure.

In accordance with one form of the present invention, there is provided a method and system of determining line-of-sight configurations between a plurality of points in three-dimensional space. The method includes selecting a first point and a second point for processing; determining whether a valid, unobstructed line-of-sight exists between the first point and the second point; if a valid, unobstructed line-of-sight exists between the first point and the second point, recording information about the line-of-sight in a first database; and if a valid, unobstructed line-of-sight does not exist between the first point and the second point, determining whether an alternative placement of at least one point results in a valid, alternative unobstructed line-of-sight between the first point and the second point, and if a valid, alternative unobstructed line-of-sight does exist between the first point and the second point, recording information about the alternative line-of-sight in a second database; repeating these steps for other combinations of points.

A method and system for determining the elevation of a node in a system for automatically determining line-of-sight configurations between nodes is disclosed. The method includes determining the node's ground location; determining the node's elevation by reading an elevation from a 3-Dimensional Map at the node's ground location; and adding the node's height to the node's elevation; whereby the 3-Dimensional map provides elevations given a ground location, wherein the elevation in the 3-Dimensional Map was determined by adding the height of any objects at a ground location to the elevation of terrain at the ground location.

A method and system for determining a possible alternative line-of-sight between a first node and a second node, wherein said nodes are located in an area for which an aerial image is available is also disclosed. The method includes determining a first degree of freedom line for the first node, and a second degree of freedom line for the second node, such that each degree of freedom line is orthogonal to the straight line between the nodes; determining a resolution of the aerial image and an alternative position data parameter; placing the first node at a first placement that is a distance equal to the resolution in a first direction along the first degree of freedom line from the current placement of the first node, and placing the second node at a second placement that is a distance equal to the resolution in the first direction along the second degree of freedom line from the current placement of the second node; determining if the straight line between the first node at the first placement and the second node at the second placement is a valid, unobstructed line-of-sight; if the straight line is a valid, unobstructed line-of-sight, saving the line-of-sight; and if the straight line is not a valid, unobstructed line-of-sight, repeating these steps until the first node has been moved the distance specified in the alternative position data parameter.

A method and system for identifying pixels in an aerial image that are part of a structure is also disclosed. The method includes obtaining the aerial image; dividing the image into blocks; for each block, clustering pixels in the image into small regions of uniform color and texture; and identifying at least one region as a structure.

A method and system for identifying tree pixels in an aerial image is also disclosed. The method includes obtaining the aerial image; identifying at least one tree in the image; creating a statistical model of tree color using the at least one identified tree; for every pixel, using the statistical model to determine the probability that a pixel is a tree; and for every pixel, if the probability that a pixel is a tree exceeds a predetermined threshold, labeling the pixel as a tree.

A method and system for creating a 3-Dimensional map of an area, wherein the 3-Dimensional map identifies every pixel in the area as a tree, house or terrain and identifies the elevation of every pixel is also disclosed. The method includes obtaining a tree map of the area, wherein the tree map identifies pixels that have been determined to be trees; obtaining a house map of the area, wherein the house map identifies pixels that have been determined to be houses; creating a city map from the tree map and the house map, wherein every pixel has a classification, wherein the classification is selected from the group comprised of tree, house and terrain; obtaining height data; obtaining terrain elevation data; and determining an elevation for every pixel.

Accordingly, the present invention provides solutions to the shortcomings of prior file acquisition and processing techniques. Those of ordinary skill in the art will readily appreciate, therefore, that those and other details, features, and advantages will become apparent in the following detailed description of the preferred embodiments.

DESCRIPTION OF THE DRAWING FIGURES

These and other objects, features and advantages of the invention will become apparent from a consideration of the Detailed Description of the Invention when read in conjunction with the drawing figures, in which.

Figure 2:
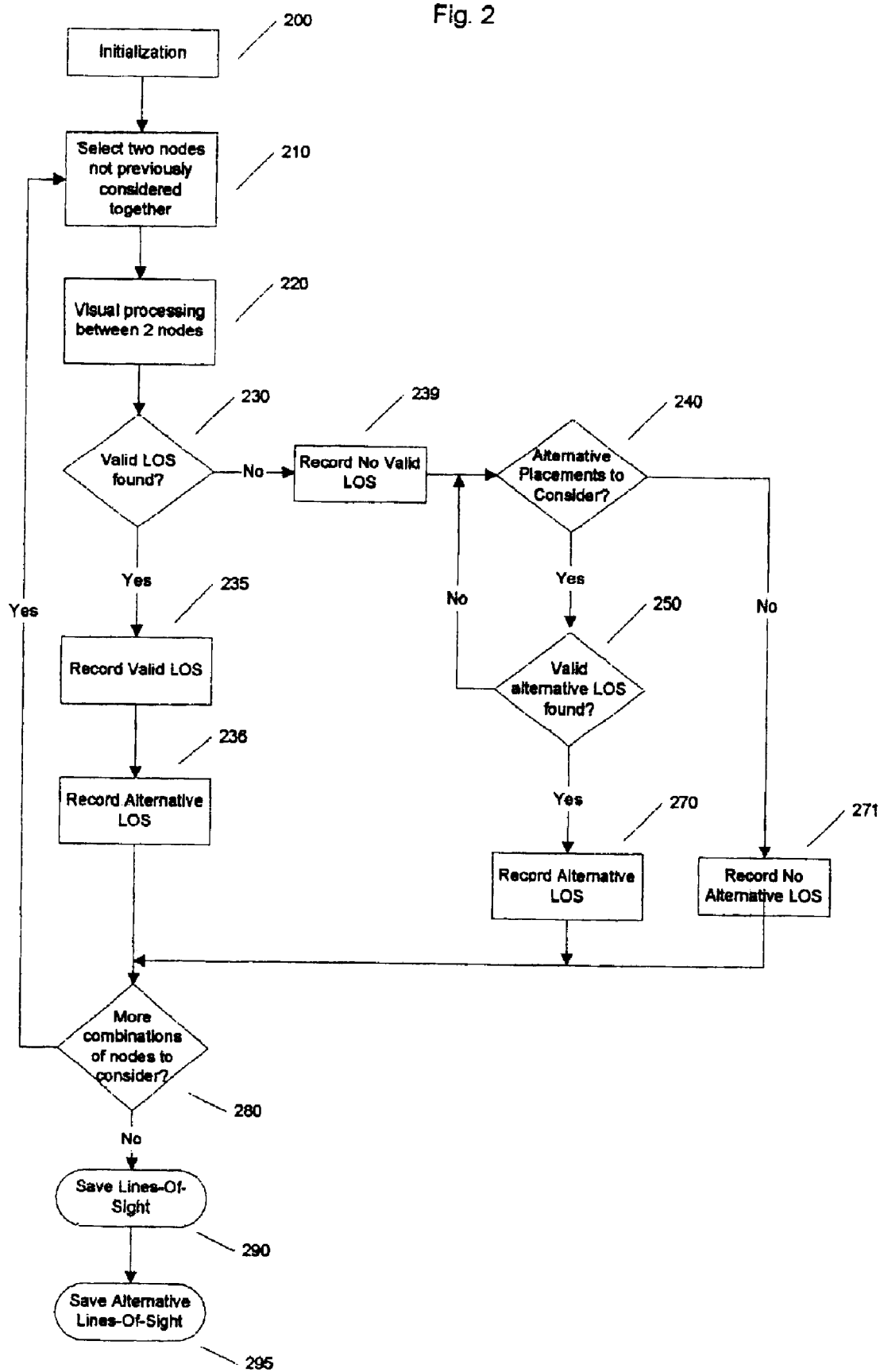
FIG. 2 is a high-level flowchart illustrating the inventive process for determining lines-of-sight for nodes in an infrared wireless network.
Figure 3A:
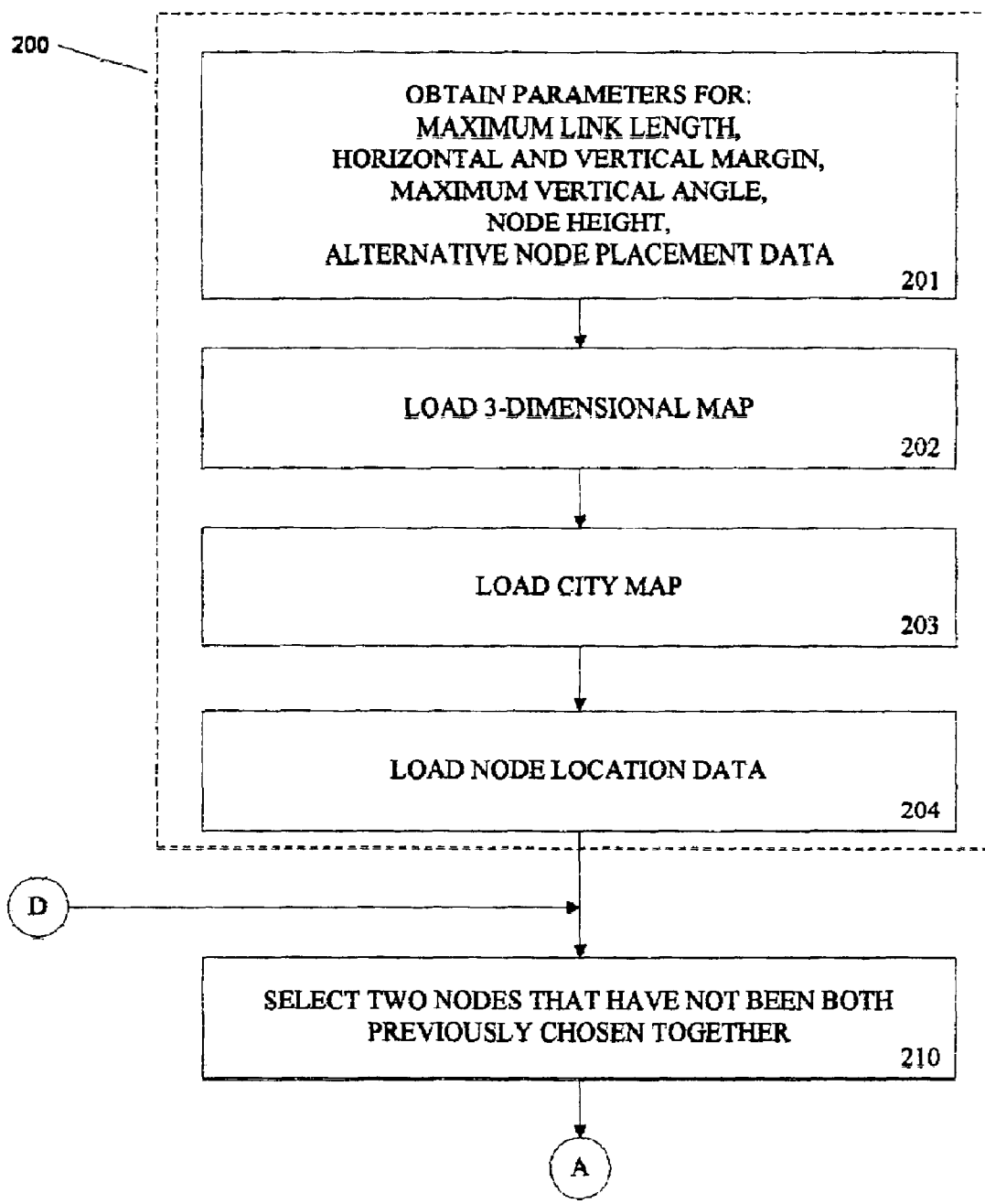
Figure 3C:
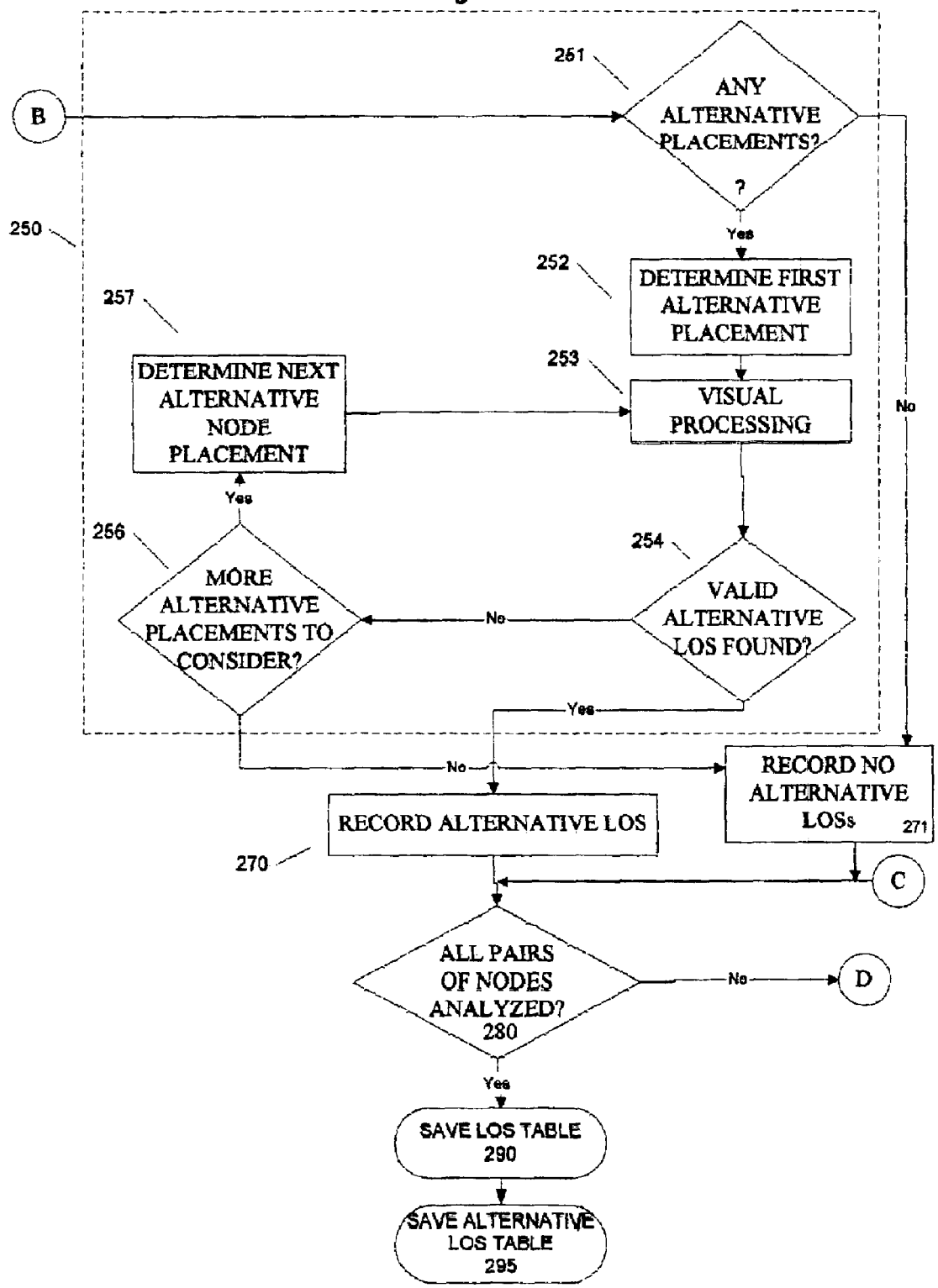
Figure 4:
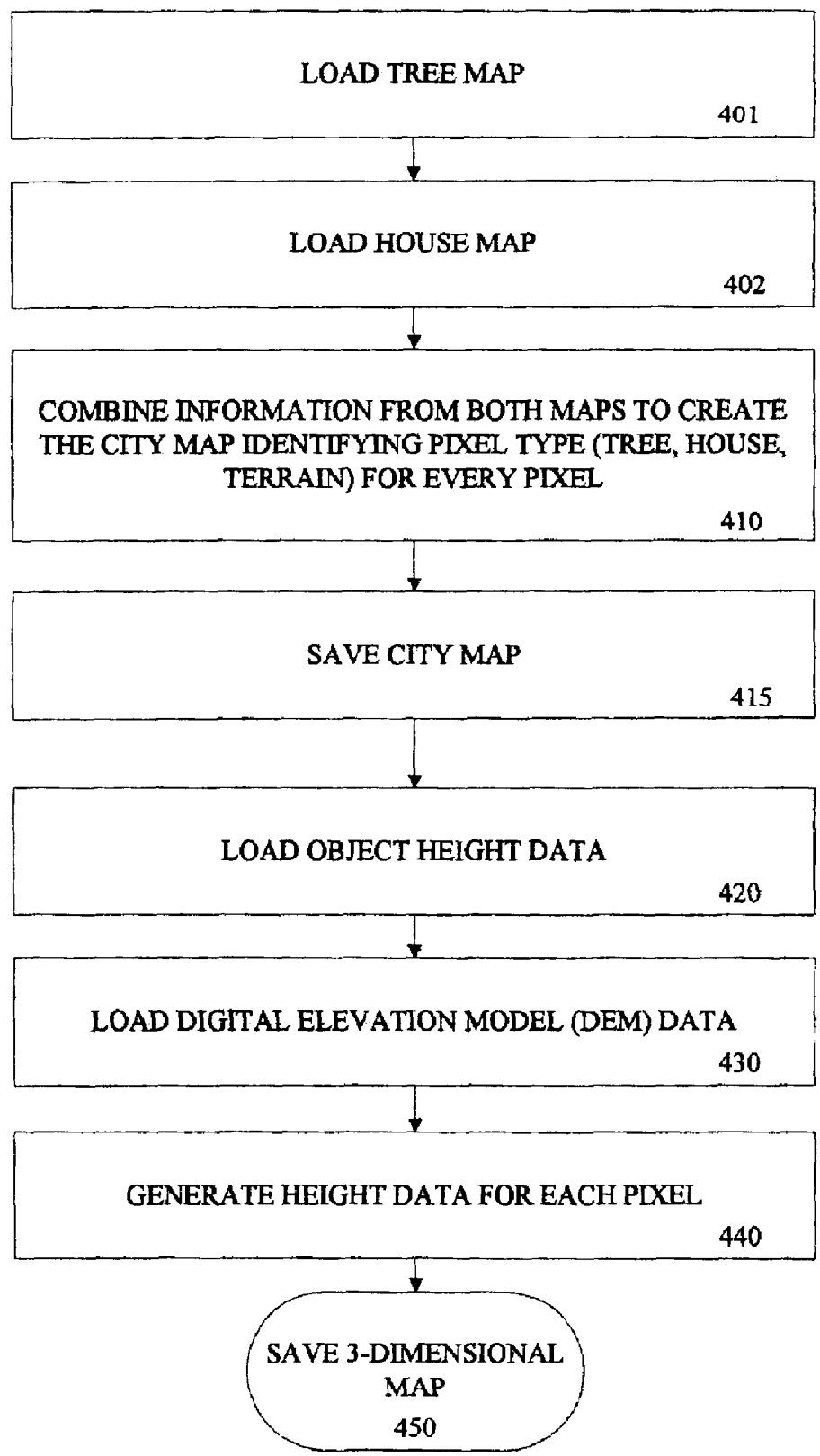
Figure 5:
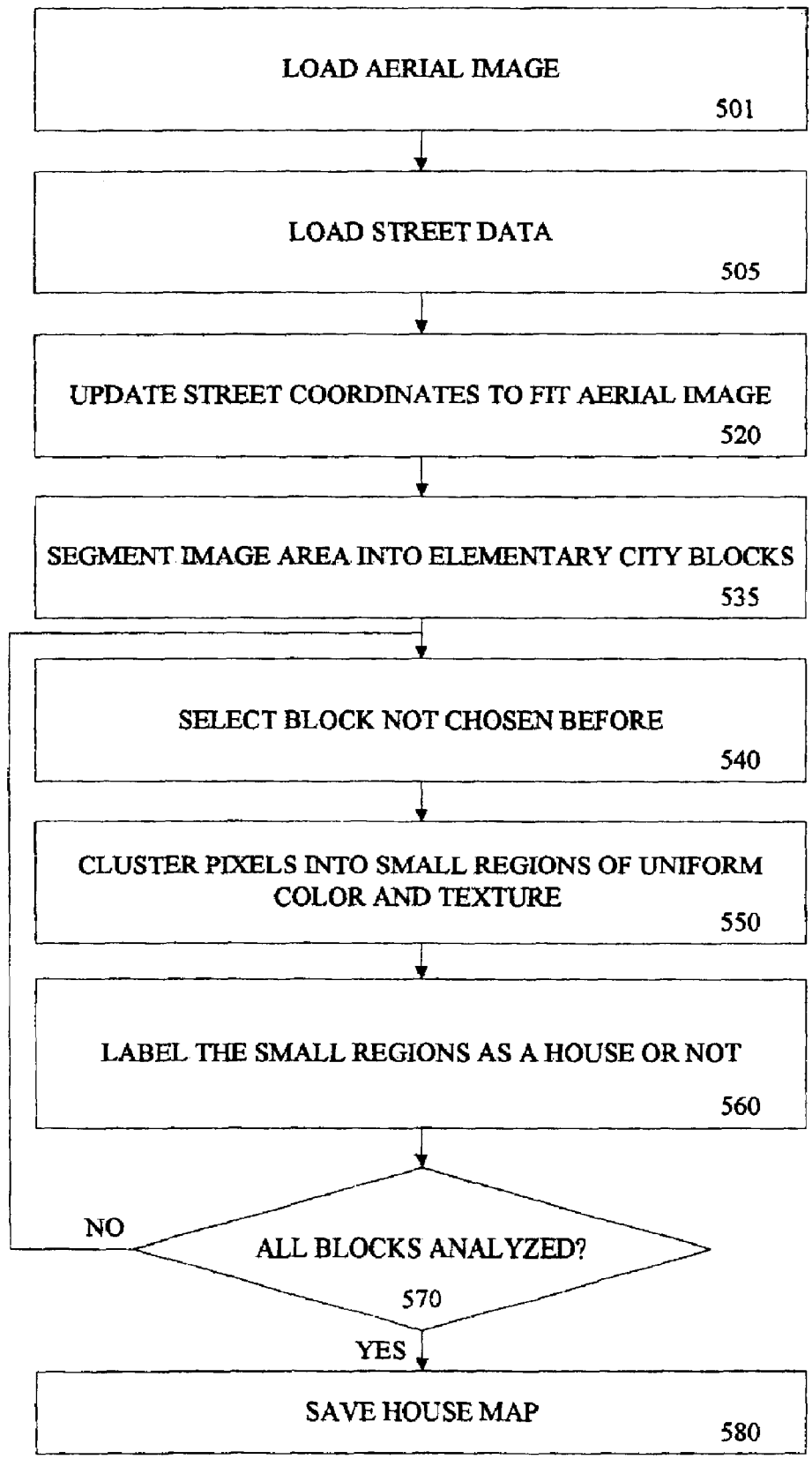
Figure 6A:
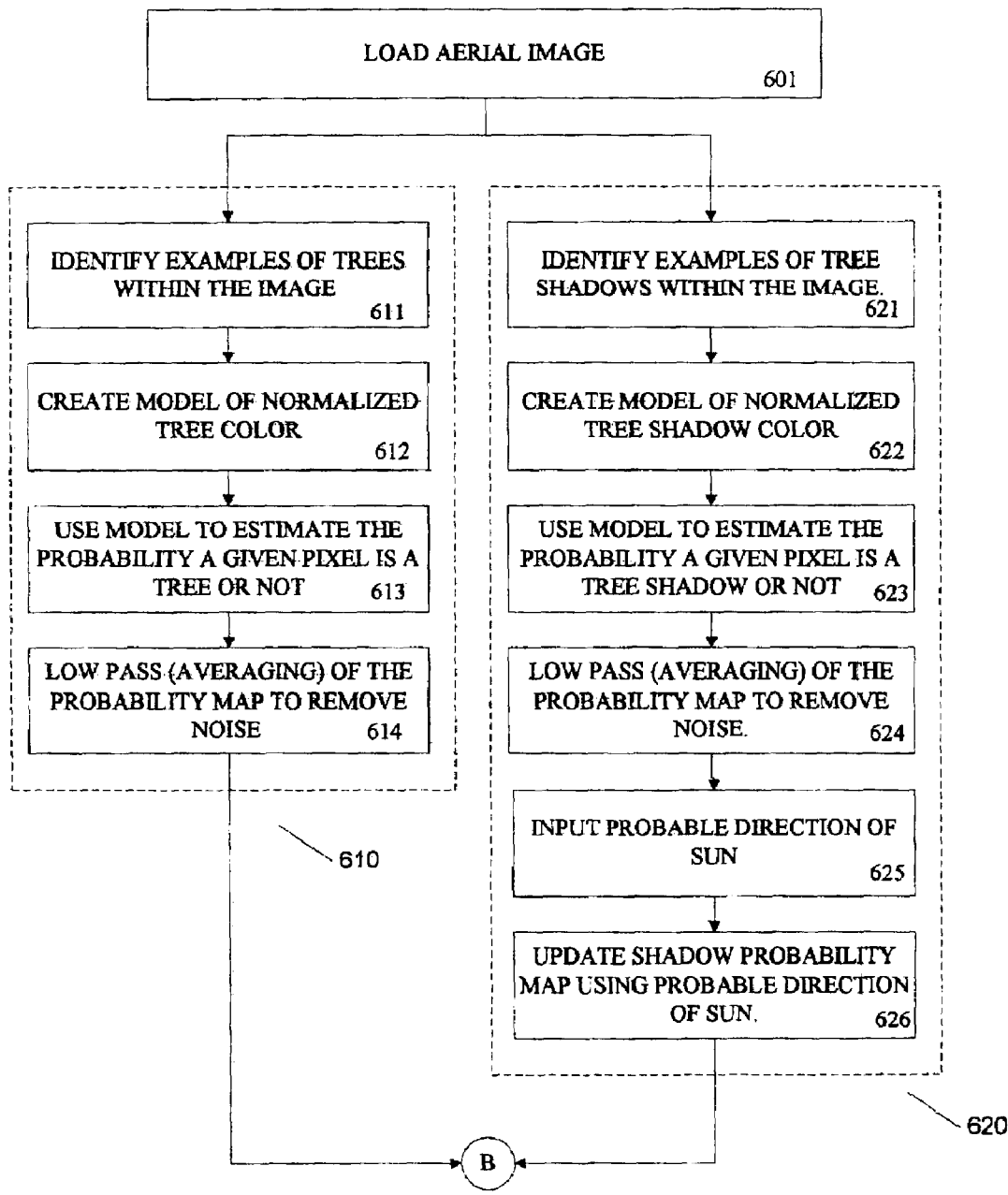
Figure 6B:
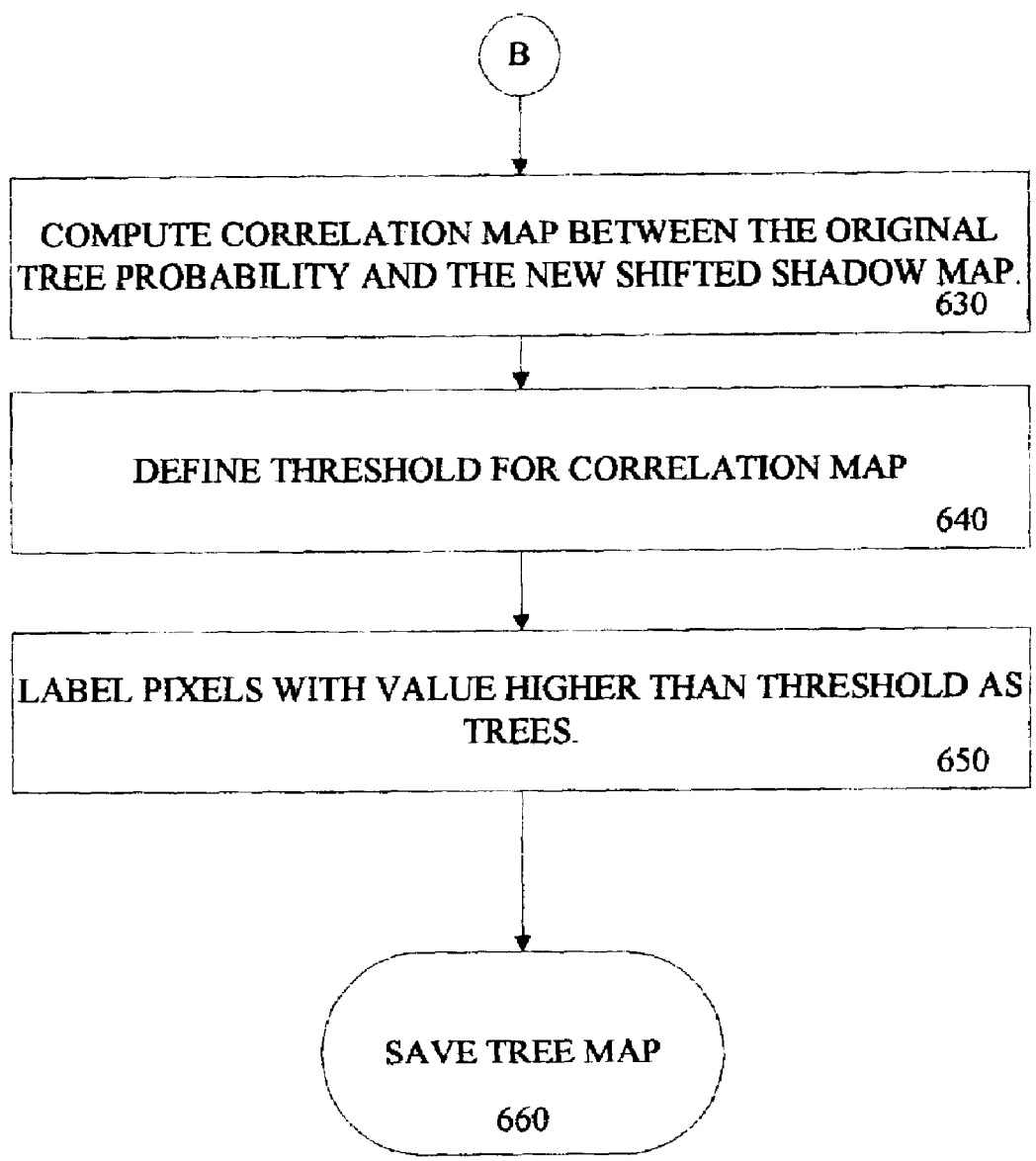
Figure 7:
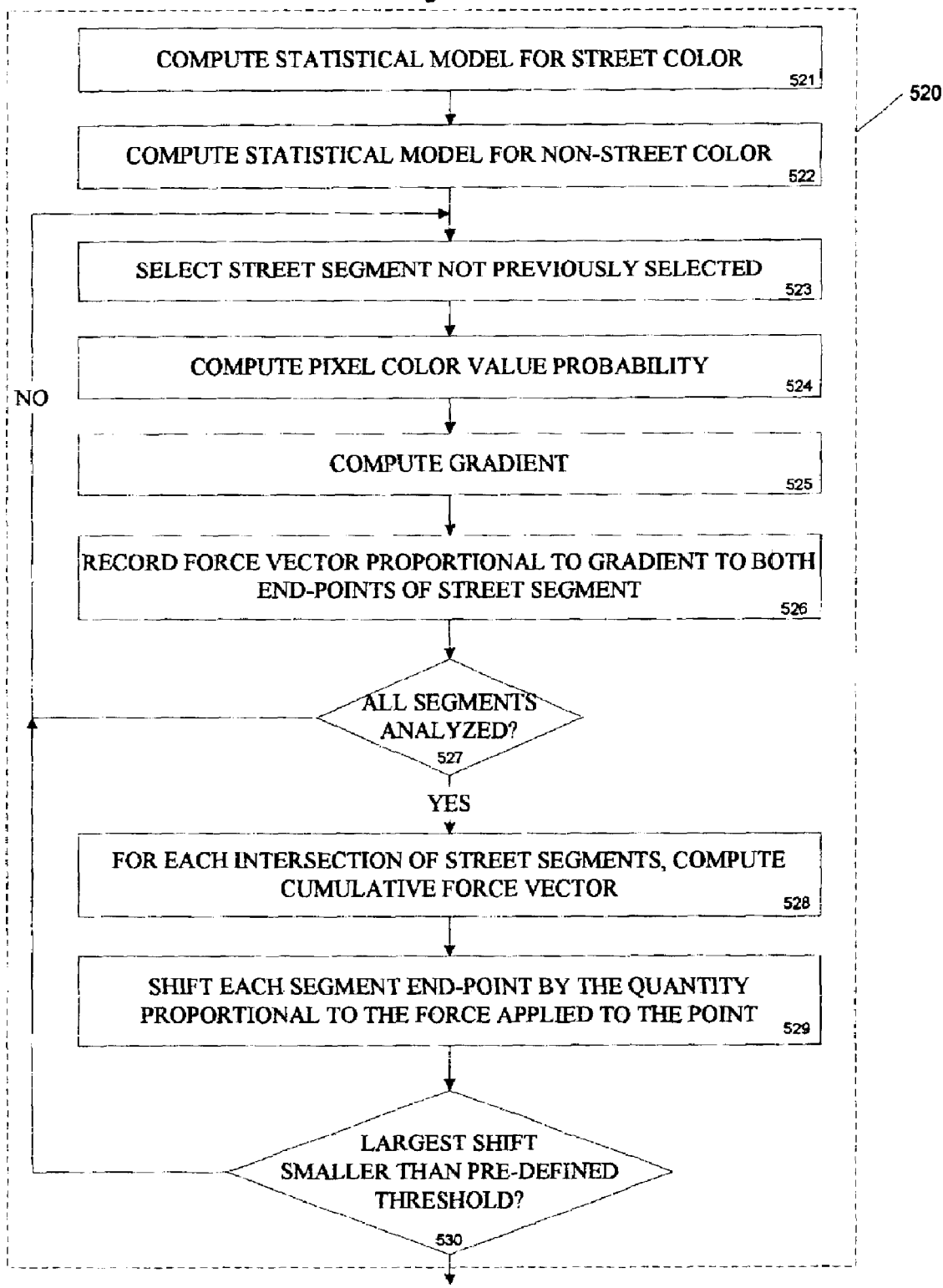
Figure 8A:
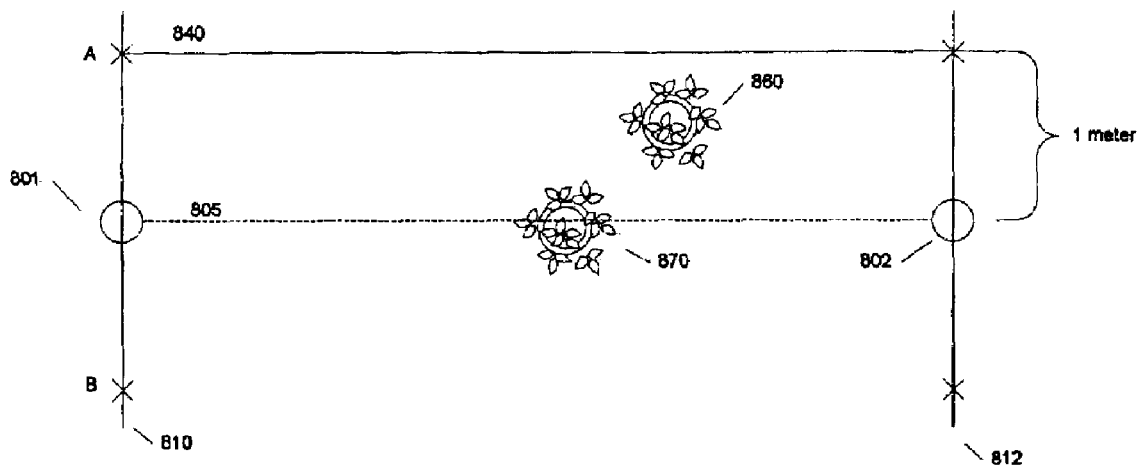
Figure 8B:
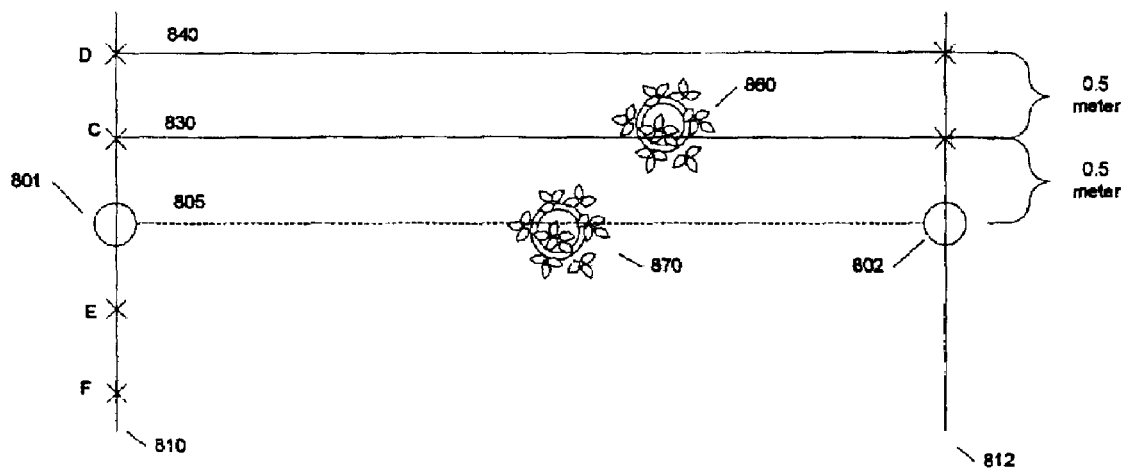

FIGS. 3A, 3B and 3C contain a more detailed flowchart of the inventive process of FIG. 2;

FIG. 4 is a flowchart illustrating a process for creating a city map and a three-dimensional terrain and object map;

FIG. 5 is a flowchart illustrating the process of creating a house map;

FIGS. 6A–6B contain a flowchart illustrating the process of creating a tree map;

FIG. 7 is a flowchart illustrating the process of fitting street segments to an aerial image; and FIGS. 8A–8B are graphs illustrating examples of finding alternative lines-of sight.

DETAILED DESCRIPTION OF THE INVENTION

With reference now to the drawing Figures, embodiments of the invention are shown and described wherein like elements are indicated by like reference numerals throughout.

Figure 1:
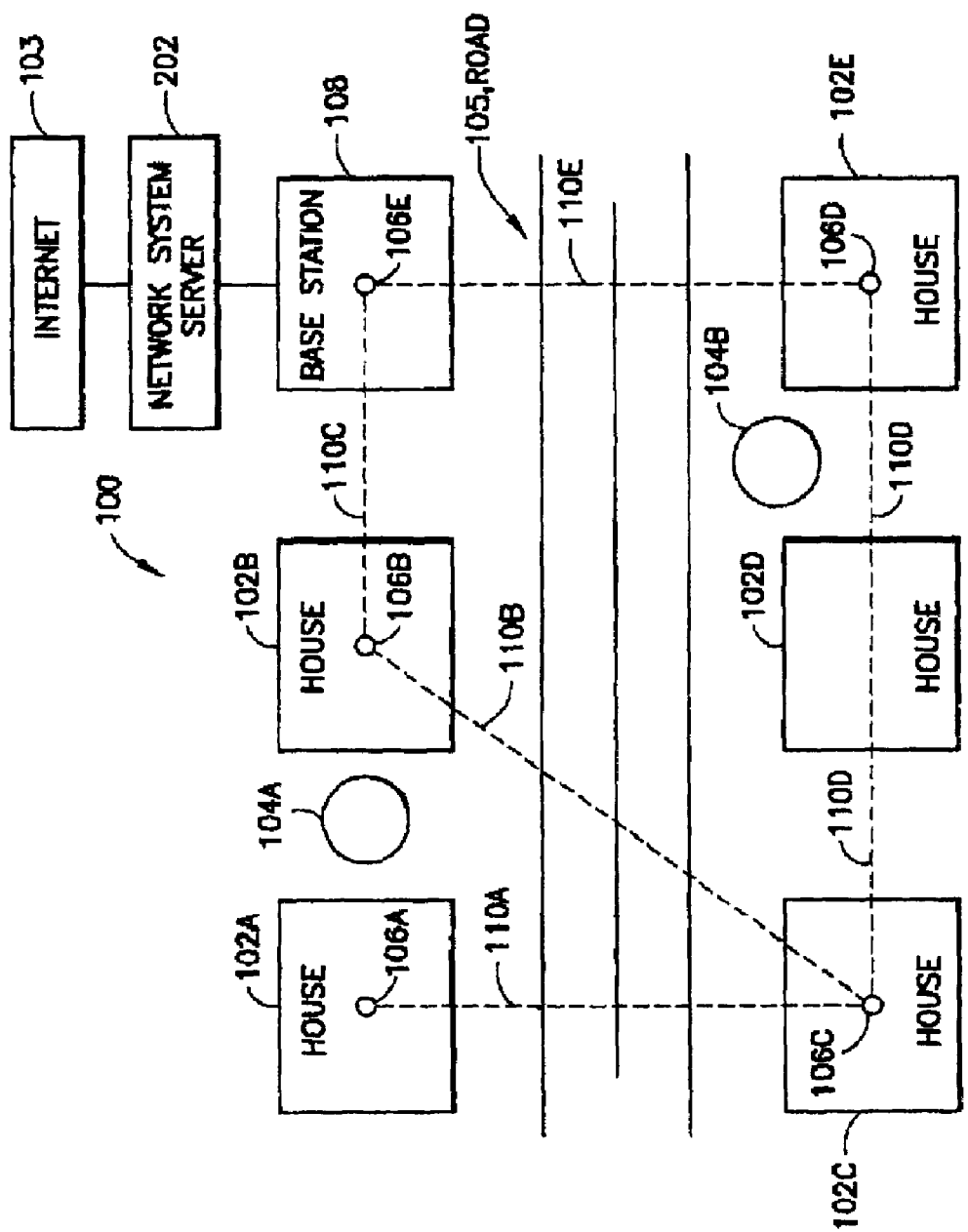
FIG. 1 is a diagrammatic view of an infrared wireless mesh network in accordance with the invention.

With reference first to FIG. 1, a diagram of a residential neighborhood 100 is shown including multiple houses indicated at 102A–E. As is typical in neighborhoods, trees or other natural obstacles exist, indicated at 104A&B, which may block lines of sight between adjoining houses. In accordance with the present invention, a series of infrared network nodes, indicated at 106A–E, are positioned on the upper, outer surfaces of the homes, for example the roofs. Note that house 102D has elected not to receive services from the described network, and so no network node is positioned on that house. Although only houses are shown in FIG. 1, it will be obvious to those skilled in the art that the nodes may be mounted on structures other than houses, such as apartment building, office buildings and the like. It is intended that the scope of the present invention include placing nodes on any type of building, structure or object.

Network node 106E is positioned on a base station 108 comprising, typically a neighboring building or cell tower providing access station to a traditional wired network. Various lines of sight between adjacent network nodes are indicated by dotted lines 110A–E.

Each network node is comprised of infrared transceivers having transmitter and receiver optics designed to facilitate line-of-sight infrared FOS communications in a residential or business neighborhood. The nodes are easily installed and configured using an application that enables new and existing nodes to be properly aligned to achieve a line-of-sight configuration with at least one other node in the network. The present invention is directed to a process used to generate possible line-of-sight configurations that may be used by this application.

There are basically three different network configurations for wireless networks. The first is a single point-to-point link, which provides a dedicated, high-capacity link between two terminals. The second is a point-to-multipoint network that includes hub stations and customer premise equipment. This typology works by placing the hub station on a tall building. Laser signals are then transmitted in a star topology to the surrounding buildings. These buildings receive and transmit the signal to customer premise equipment mounted on the roof or placed in windows.

Another, more reliable, type of network configuration is the mesh network. This typology is an extension of point-to-point links and is designed to provide last-mile access. The mesh network is comprised of short, redundant links, eliminating a single point of failure and ensuring carrier-class reliability, even in dense fog. The present invention is described in terms of a point-to-point mesh network topology, however it will be obvious to one skilled in the art the system and method of present invention is not limited to a point-to-point mesh network, and may be applied to other network configurations.

In a mesh network configuration, it is therefore important to be able to determine all potential lines-of-sight between points. In the present application, a process for systematically processing every node in a geographical area to determine all possible line-of-sight configurations is disclosed. The present invention may be used to automatically determine potential line-of-sight configurations between nodes in a network, and save these line-of-sight configurations to a database or file. This file can then be used by an application to configure the nodes in a FOS system.

Line-Of-Sight Processing

The basic process used by the inventive method to evaluate a neighborhood or other defined geographical area to determine potential line-of-sight connections for nodes is shown in FIG. 2. The process of FIG. 2 is shown in more detail in the expanded flowchart of FIGS. 3A, 3B and 3C. The high-level process shown in FIG. 2 will be discussed first, then the details as shown in FIGS. 3A, 3B and 3C.

As shown by step 200 in FIG. 2, the process first performs some basic initialization functions. In this step certain variables are initialized and maps loaded into the application.

After initialization step 200, the main processing loop begins at step 210 where two nodes are selected. In the first iteration, any two nodes may be selected. After the first iteration of the loop, two nodes that have not previously been considered together are selected. As will obvious to those skilled in the art, there are many methods of selecting pairs of nodes, and the pair of nodes selection process may be done by any method known to those skilled in the art. The loop between step 210 and step 280 is repeated until every combination of two nodes is considered and all valid lines-of-sight determined. In addition, although the inventive process is described in terms of finding lines-of-sight between two nodes in a wireless IR network, it will be obvious to those skilled in the art that the inventive process may be used to find valid, unobstructed lines-of-sight between any two points in three-dimensional space. The scope of the present invention is not intended to be limited to nodes in a wireless network.

For each pair of points or nodes, the application performs visual processing between the nodes as shown by step 220. In this step the application determines the three-dimensional location of each node, and calculates the straight line between the two nodes. This visual processing is done using a three-dimensional map of the area under consideration. This three-dimensional map includes the houses or other structures upon which a node may be installed, trees and other potential obstructions to a line-of-sight between nodes.

At step 230, the validity of the straight line is considered. If the line is determined to be a valid, unobstructed line-of-sight at step 230, then it is recorded as a valid line-of-sight at step 235, and in a preferred embodiment, also as an alternate line-of-sight between the nodes at step 236. If it is determined to not be a valid, unobstructed line-of-sight, then it is recorded that there is no valid line-of-sight between the two nodes at step 239 and alternative node placement is considered beginning at step 250.

In a preferred embodiment, if a node can be installed at alternative positions on a house or other structure, these alternative placements for the nodes are considered in step 250. In a preferred embodiment, these alternative placements for the pair of nodes currently under consideration are considered until a valid alternate line-of-sight is found, or until all possible combinations of alternative placements are considered. That is, if either node has at least one alternative placement, the node is "moved" to alternative placements on the house or other structure to see if the alternative placement would provide a valid, unobstructed line-of-sight. If a valid alternative line-of-sight is found, the valid alternate line-of-sight is recorded at step 270. If all alternative placements are considered and no valid alternative line-of-sight found, then it is recorded that there is no alternative line-of-sight for this pair of nodes at step 271. The process continues to step 280, where a new pair of nodes are selected for line-of-sight processing.

Once all combinations of nodes have been considered and all valid lines-of-sight have been determined and recorded, a Line-Of-Sight table file is created and saved at step 290. In addition, the Alternative Line-Of-Sight table file is created and saved at step 295. The Line-Of-Sight table contains all of the valid lines-of-sight recorded at step 235, and in a preferred embodiment, also contains the records from step 239 that record information about the line between two nodes that is not a valid line-of-sight. The Alternative Line-Of-Sight table contains records from steps 270 and 271 that record information regarding valid, alternative lines-of-sight, and preferably, information about the line between alternative placements of nodes that are not valid, alternative lines-of-sight. The Line-Of-Sight table file and the Alternative Line-Of-Sight table file are used by an application to adjust and install new FOS nodes in the network.

Step 200 is shown in more detail in FIG. 3A as steps 201, 202, 203 and 204. At step 201, certain parameters that will be used by the process to make the line-of-sight determinations are acquired. These parameters may be set in the software code, or may be entered by a user, or some combination thereof. As shown, these parameters may include Maximum Link Length, Horizontal Margin, Vertical Margin, Maximum Vertical Angle, Node Height, and Alternative Node Placement Data.

The Maximum Link Length parameter is the maximum distance allowed between two nodes. It will be obvious to one skilled in the art that the Maximum Link Length may be set to different values for different neighborhoods, or for various circumstances. For example, the Maximum Link Length may be set to 400 meters. For more conservative processing, the Maximum Link Length will be shorter. A shorter Maximum Link Length results in a higher probability that fog or other weather conditions will not bring the link down. A longer Maximum Link Length results in a higher probability that two nodes can be connected. The Horizontal and Vertical Margin parameters are used to define an area around the line-of-sight in which there must be no obstruction. For instance, if the Horizontal Margin is 1 meter and the Vertical Margin is 2 meter, the process will ensure that no obstructions exist within 1 meter of the line-of-sight in the horizontal direction, and 2 meters in the vertical direction.

The Maximum Vertical Angle parameter accounts for the angling limitations of the node. The "Vertical Angle" of the straight line between two nodes refers to the angle the straight line makes with the vertical. The Maximum Vertical Angle ensures that no line-of-sight between two nodes is configured such that the line-of-sight exceeds the angling limitation of a node. For example, the node may be adjustable by a maximum of 15 degrees. If there is a large hill in the topography, this limitation may prevent a line-of-sight between that node and another node if the node would have to be adjusted more than 15 degrees. Therefore, if the straight line between two nodes results in a vertical angle of greater than Maximum Vertical Angle of 15 degrees, the straight line is not a valid line-of-sight between the two nodes.

The Node Height parameter is used by the inventive process to adjust for the height of the node, and for any other node height adjustments, such as if the node were to be mounted on a pole. The Alternative Node Placement Data parameter allows the process to attempt to find alternative lines-of-sight by placing the nodes in alternative positions on the underlying house or structure. For example, the nodes may be placed on the center of the roof by default. However, if there is no line-of-sight found for the nodes from this location, the process allows the nodes to potentially be placed at alternative positions, such as a certain distance from the default location to the north side, south side, east side or west side of the roof. The Alternative Node Placement Data parameter is used to calculate these alternative placements, and alternative lines-of-sight, as will be discussed in more detail below.

At steps 202, 203 and 204, various maps and data are loaded that are used by the inventive process to determine possible alternative lines-of-sight. The 3-Dimensional Map in step 202 is a map of the area under consideration in which every pixel has an associated elevation that represents the terrain elevation adjusted for buildings, trees and other objects at that pixel's location. The City Map in step 203 is a map of the area under consideration in which each pixel has a number or code specifying the type of pixel it is (house, tree, terrain, etc.). These maps are discussed in more detail in connection with FIGS. 4, 5 and 6. The Node Location Data table in step 204 is a table containing a record for each node in the system. The records in the Node Location Data table preferably store the ground coordinates of the nodes' positions. The Node Location Data table may contain additional information, such as an identifier of the house or other structure on which the node is installed.

Processing begins with step 210, when two nodes are selected for line-of-sight processing. The visual processing step 220 from FIG. 2 is broken into three steps in FIG. 3B. In step 221, the elevation of each node in the current pair of nodes under consideration is determined. In a preferred embodiment, the elevation is determined by first reading the ground coordinates for each node from the Node Location Data table. This provides the information needed to determine which pixel in the 3-Dimensional Map is associated with that position. The elevation of the node is the elevation of that pixel in the 3-Dimensional Map. As will be discussed in more detail below, the elevations in the 3-Dimensional Map have been adjusted for the heights of the house or other structure upon which the node is installed.

The node's adjusted elevation is determined from the associated pixel's elevation in the 3-Dimensional Map at step 221. At step 222, the node's elevation is adjusted by the Node Height. This parameter was acquired in step 201. This is done to account for the height of the IR node device. The elevations of both nodes under consideration are determined in this manner. It is these adjusted elevations that are used when the straight line between nodes is determined in step 223.

The straight line between the nodes under consideration is then determined at step 223. As will be obvious to one skilled in the art, there are any number of methods of determining the line between two points, and it is intended that these methods come within the scope of the present invention.

Next, whether or not the straight line between the nodes is a valid line-of-sight is determined. The first validity test occurs at step 231. At this step, the length of the straight line calculated in step 223 is compared to the Maximum Link Length parameter acquired in step 201. If the length of the line between the nodes exceeds the Maximum Line Length, then it is not a valid line-of-sight, and the other validity tests do not need to be performed. In this case, it is recorded that there is no valid line-of-sight between the two nodes in the Line-Of-Sight table at step 239, and processing for the two nodes proceeds to step 250, where alternative node placements are considered. However, if the length of the line between the nodes does not exceed the Maximum Link Length, a second validity test is performed at step 232. At step 232, the "vertical angle" of the straight line between the nodes, or the angle of the straight line to the vertical plane, is compared to the Maximum Vertical Angle. This test is performed to ensure that the angle to which the node is adjusted does not exceed the capabilities of the node device. For instance, if the vertical angle between two nodes is 20 degrees due to one node being placed on a very low building and the other node being placed atop a very tall building, and the node device is only capable of being adjusted to 15 degrees, (i.e. Maximum Vertical Angle is 15), the straight line between the nodes cannot be a line-of-sight as the nodes will physically be incapable of alignment. In alternative embodiments, there may be fewer or additional validity checks made on the straight line, as will be obvious to those skilled in the art.

If the length of the line and the vertical angle of the line are determined to be within range in steps 231 and 232, then the process continues to step 233 to determine whether there is an unobstructed line-of-sight between the nodes. In this step, the data in the 3-Dimensional Map is used to determine whether or not there are any objects along the path of the straight line between the two nodes. In order to account for small errors that may be in the map data, and trees and other objects that may move slightly from time to time causing them to be within the line-of-sight upon occasion, the process "thickens" the line by a certain margin. In a preferred embodiment, the process considers a volume around the line defined by the Horizontal Margin and Vertical Margin. In effect, by considering the Horizontal and Vertical Margins, the line becomes a rectangular prizm that extends between the nodes. Although a rectangular prizm defined by a Vertical Margin and a Horizontal Margin is used in this embodiment, it will be obvious to those skilled in the art that other methods could be used to create a volume around the line. For example, a cylinder around the line could be used instead of a rectangular prizm. It is intended that alternative methods of creating a volume around the line come within the scope of the present invention.

In a preferred embodiment, the process of determining whether or not there is an obstruction along the "thickened" line is implemented by considering the elevation of each point in the "thickened" line and the 3-Dimensional Map one pixel at a time. If a particular pixel in the 3-Dimensional Map has a higher elevation than the "thickened" line at that point, then there is an obstruction at that point. As soon as the first obstruction is encountered, it is determined that the straight line is not a valid line-of-sight, and further consideration of the thickened straight line is not needed. In this case, the process proceeds to step 239, where it is recorded that the straight line between the nodes currently under consideration has an obstruction, and processing for the two nodes proceeds to step 250, where alternative node placements are considered.

If there are no intersections between any pixel in the "thickened" line and an object in the 3-Dimensional Map, then the line is a valid line-of-sight, and is recorded in the Line-Of-Sight table at step 235. In a preferred embodiment, it is also recorded in the Alternative Line-Of-Sight table at step 236.

As discussed above, the Line-Of-Sight table records valid lines-of-sight, and also preferably records when there is no valid line-of-sight between nodes. In a preferred embodiment, there will be a record in the Line-Of-Sight table for every combination of nodes.

An example of the fields and format of a record that may be used in the Line-Of-Sight table is:

<$1^{st}$ node ID><house ID for $1^{st}$ node><$1^{st}$ node x coordinate><$1^{st}$ node y coordinate><$1^{st}$ node elevation><$2^{nd}$ node ID><house ID for $2^{nd}$ node><$2^{nd}$ node x coordinate><$2^{nd}$ node y coordinate><$2^{nd}$ node elevation><number of obstacles between nodes><link length>

As shown in this example, each Line-Of-Sight record identifies the two nodes ($1^{st}$ node ID, $2^{nd}$ node ID), the houses on which they are installed (House ID), the three-dimensional position of each node (x coordinate, y coordinate, elevation), the length of the line between the nodes and whether or not it is a valid line-of-sight. For example, in one embodiment, if <number of obstacles between nodes> is 0—then it is a valid line-of-sight. If <number of obstacles between nodes> is 1, then it is not a valid line-of-sight. More or fewer fields could be used in the Line-Of-Sight table, as will be obvious to those skilled in the art, and it is not intended that the present invention be limited to this example.

Although a record indicating a lack of a valid line-of-sight will not be directly used to configure two nodes, it can provide important information to the application. By recording this information also, the application is able to use the data to determine metrics, for example. In addition, if the example Line-Of-Sight table field format above is used, the Line-Of-Sight table will also record the distance between any two nodes, whether or not there is a valid line-of-sight between the nodes.

At this point in the processing, if there is no valid line-of-sight, alternative placements for the nodes are considered at step 250, the details of which are shown in FIG. 3C. First, at step 251, it is determined whether there are alternative node placements that may be considered. If there are any alternative placements for either of the nodes, the nodes are "moved" to alternative positions on the structure. If the nodes do not have any alternative placements, it is recorded that there are no alternative lines-of-sight for these two nodes at step 271, and the process continues to step 280.

If there are alternative node placements to consider, the process moves to step 252. As shown by the loop 253-254-256-257, alternative node placements are considered one by one until the first valid alternative line-of-sight between the two nodes is determined. In an alternative embodiment, the process is repeated for every possible alternative node placement, and all alternative lines-of-sight are determined. FIG. 3C shows an embodiment where each combination of alternative placements for the nodes is considered in the loop until a valid alternative line-of-sight is found, or there are no more alternative placement combinations to consider.

In a preferred embodiment, the alternative node placements (step 252 and 257) are determined through the Alternative Node Placement Data parameter that specifies a distance, and a degree of freedom line. Preferably, the degree of freedom line is a line orthogonal to the straight line between the two nodes under consideration. In this embodiment, the distance specified in the Alternative Node Placement Data parameter determines how far "up" and "down" the degree of freedom line to "move" the nodes. The process "moves" the node stepwise along the degree of freedom line by the distance specified in the Alternative Node Placement Data parameter. An example of the process of determining alternative node placement positions is shown in FIG. 8.

FIG. 8A illustrates a case where the straight line 805 between two nodes 801, 802 is not a valid line-of-sight as there is a tree 870 obstructing the line 805. In this example, an alternative line-of-sight is determined by moving both nodes in the same direction along the degree of freedom lines 810, 812. In the example shown in FIG. 8A, the resolution is one meter, and the Alternative Node Placement Data parameter is also one meter. Therefore, there are only two points on the degree of freedom line to check for alternative lines of sight—one step up the degree of freedom line (A position), and one step down the degree of freedom line (B position). Using the example shown in FIG. 8A, the nodes are "placed" at position A at step 252, and visual processing is performed with the nodes at this first alternative node position.

Steps 253 and 254 perform the same processing as steps 220 and 230, discussed above. Namely, the elevation of the nodes at the alternative placements is calculated, the straight line between the nodes in the alternative placements is determined, and then the validity of this line is considered. If the length of the line is less than the Maximum Link Length, the vertical angle is less than the Maximum Vertical Angle, and there are no obstructions as determined from the 3-Dimensional Map, then the current alternative node placements results in a valid alternative line-of-sight, which is recorded at step 270. If the current alternative placement does not result in a valid, alternative line-of-sight, processing continues to step 256, the process determines whether or not there are more combinations of alternative node placements to consider. If there are additional alternative node placements to consider, the process loops back through the process at step 257. If none of the alternative placements result in a valid, unobstructed alternative line-of-sight, this is recorded at step 271.

In the example shown in FIG. 8A, there are no obstructions along the straight line 840 between the nodes when the nodes are placed one meter "up" the degree of freedom line (position A), and therefore these alternative node placements would be saved as a valid alternative line-of-sight (assuming that the line passed any other validity tests, such as length and vertical angle). Because position A results in a valid alternative line-of-sight, in a preferred embodiment, the alternative line-of-sight determination is not made for position B. However, in alternative embodiments, this processing may be performed.

In the example shown in FIG. 8B, the resolution is 0.5 meters, and therefore an Alternative Node Placement Data parameter of 1 meter would result in four alternative placements for the nodes, as shown by positions C, D, E and F. Placing the nodes at Position C would also result in an obstructed line-of-sight because of tree 860, and is therefore not a valid, alternative line-of-sight. Therefore, the process loops through the steps again, determining and processing Position D. In this example, placing the nodes at Positions D result in a valid, unobstructed line-of-sight, and therefore Positions E and F are not tested. The straight line from placing the nodes at Position C is recorded in the Alternative Line-Of-Sight table as an invalid alternative line-of-sight, and the straight line from placing the nodes at Position D is recorded in the Alternative Line Of Sight table as a valid alternative line-of-sight.

In the preferred embodiment, as shown in FIG. 8, the nodes are moved together along the degree of freedom line. As will be obvious to those skilled in the art, it is possible to move the nodes in opposite directions, move only one node or have a different degree of freedom line. It is also possible that the Alternative Node Placement Data parameter contains additional information eliminating the need for a degree of freedom line to determine alternative node placements. It is intended that these alternatives come within the scope of the present invention.

Valid and invalid alternative lines-of-sight are saved in an Alternative Line-Of-Sight table. The format of this table is very similar to the Line-Of-Sight table, with the addition of alternative node placement information.

The Line-Of-Sight table and the Alternative Line-Of-Sight table are saved at steps 290 and 295. These tables may then be used by an application to automatically setup and configure nodes in an FOS network. Other applications will be obvious to those skilled in the art and are intended to come within the scope of the present invention.

Geographic File Processing

The above process relies on geographic terrain information for the area under consideration in order to make the line-of-sight determinations. In a preferred embodiment, a City Map of the area under consideration is created that identifies every pixel as being a part of the terrain, part of a house or part of a tree. In a preferred embodiment, a 3-Dimensional Map is also created wherein each pixel is assigned an elevation based on the elevation of the terrain adjusted for the estimated heights of houses, trees and other objects. These maps are then used by the Line-Of-Sight determination process as described above. The process for creating the City Map and the 3-Dimensional Map is shown in FIG. 4.

As shown, at step 401, a Tree Map file is loaded, and at step 402, a House Map is loaded. Trees and houses are the two primary things to consider when determining lines-of-sight, as the nodes are installed on the houses, and it is the trees and other houses that tend to obstruct lines-of-sight between nodes. As will be obvious to those skilled in the art, additional maps may be loaded in order to create the City Map and the 3-Dimensional Map files. For example, there could be additional maps identifying office buildings, malls, water towers, etc. The processes for generating the Tree and House maps are shown in more detail in FIGS. 5 and 6, and discussed in detail below.

At step 410, the information from the Tree Map and the House Map is combined to create a City Map. The City Map identifies and marks each pixel in the area as being a Tree, House or Terrain pixel. In the Line-Of-Sight determination process described above, this City Map with labeled pixels is used to identify potential sites for a node (houses), and obstructions for a potential line-of-sight (tree or house). As will be obvious to those skilled in the art, the City Map is not limited to houses and trees, and may take other physical objects and factors into consideration. At step 415, the City Map is saved to a file.

At step 420, object height data is loaded. This data may be entered by a user through an interface, and/or may be set in the software. In a preferred embodiment, default values are set, but a user may change the value. In one embodiment, every tree is assumed to be the same height, and therefore a single value for tree height is entered or loaded. For example, a user may enter a value of 20 meters for trees. Likewise, houses may all be assumed to be of the same height. For example, a user may enter a value of 9 meters for a house. In alternative embodiments, different types of trees or houses may be identified, and different heights assumed accordingly. These different types of height assumptions may be made based on the color of the tree or house, or other factors.

At step 430, the actual Digital Elevation Models (DEM) for the area under consideration are loaded. The DEM data may be acquired from the U.S. Department of the Interior, or from any other source known to those skilled in the art. The DEM provides elevation information for the terrain under consideration. That is, the elevation of the terrain is provided in the DEM with a given resolution. This elevation is typically in the form of meters above sea level. The DEM elevation data is combined with the City Map to extract out the elevation data for each pixel within the City Map. The extracted elevation data is then combined with the Object Height Data of step 420 to generate adjusted elevation data for each pixel at step 440. For example, from the DEM data, it is determined that the elevation of a particular pixel is 200 meters above sea level. From the City Map, it is determined that the pixel has been determined to be part of a tree. Therefore, if in a particular area trees are assumed to be 20 meters tall, this pixel's adjusted elevation is calculated to be 220 meters. The type of pixel and the adjusted elevation is saved to the 3-Dimensional Map. Another pixel has been determined to be terrain. The DEM for this pixel provides that it is 195 meters above sea level. Terrain pixels are typically assumed to have no additional height and therefore this pixel's adjusted elevation is calculated to be 195 meters.

At step 450, a 3-Dimensional Map file is saved. In the City Map, every pixel is identified by type (house, tree or terrain), and in the 3-Dimensional Map, every pixel has an adjusted elevation. These maps provide basic information to the line-of-sight determination process described above. As described in the line-of-sight determination process, this information is then used to generate valid lines-of-sight between nodes.

FIG. 5 shows the process for generating the House Map used by the Line-Of-Sight determination process. At step 501, an aerial image of the area under consideration is loaded. This image may be generated by aerial photography, for example. Typically, each pixel in the image represent one meter. In a preferred embodiment, the aerial image is a color image.

At step 505, street data for the area under consideration is loaded. This map is preferably a standard electronic street map that may come from many different sources, as will be known to those skilled in the art. For example, the map may be a TeleAtlas map. Companies such as TeleAtlas and ESRI provide detailed street maps of the United States and beyond. These maps include data such as street names and locations, and rough postal addresses. This information is used to identify houses.

At step 520, the edges of the streets from the street data are matched with the aerial image. Typically, the standard street line segments in the street data does not fit exactly on the aerial image, and therefore the street coordinates are updated to better fit the aerial image. FIG. 7 illustrates a preferred method for performing step 520.

Standard street data consists of line segments that represent the center line of a street, typically in the form of line segment endpoint coordinates. Standard street data also typically provides information associated with each street segment, such as category of street (i.e. local road, highway, etc.), street name, and the range of street addresses covered by the segment. Street data also typically includes the coordinate points that represent street intersections. The street segments constitute a graph, where endpoint coordinates are the nodes and street segments are the arcs. The algorithm shown in FIG. 7 provides a method for updating the segment endpoints such that the segments more closely match the streets in the aerial image, leaving the graph topology unchanged.

Steps 521 and 522 are initialization steps. In these steps, statistical models for street color and for non-street color are calculated. Typically, manually provided image locations that contain streets and non-street areas are used to do this calculation, which may be done by any method known to those skilled in the art. A preferred probabilistic model uses a Mixture of Gaussians distribution technique, described herein in connection to FIG. 6. Once these two statistical models have been calculated, the probability that a pixel in an image having a color value c=(hue saturation value) belongs to a street or to a non-street respectively can be computed.

At step 523, a street segment is selected for processing. Ideally, a street segment should lie in the middle of the corresponding street in the aerial image. The current placement of the street on the aerial image is compared to the color of the pixels at the point of placement. At step 524, the probability $P_s$ that the current segment is accurately placed along the center of the corresponding street in the aerial image is computed by comparing the expected pixel values to the actual pixel values in the image. Given the current estimate of segment location and the width of the street inferred from the street category, the algorithm computes which pixels in the image should contain street and which ones should contain non-street. $P_s$ is computed accumulating the probabilities of color values of the pixels expected to belong to street and probabilities of color values of the pixels expected to belong to non-street using the probabilities of street color and non-street color computed in steps 521 and 522.

To determine the direction in which to shift the street, at step 525, the gradient of the $P_s$ calculated in step 523 with respect to a 2-dimensional shift of the street segment is computed. The street parameters (segments endpoints and width of street) are moved in this direction to reduce the gradient. This is accomplished by calculating a 2-dimensional force vector Fs proportional to such gradient and applying $F_s$ to both segment endpoints at step 526. This analysis is repeated for all street segments.

At step 528, a cumulative force vector $F_I$ is computed for each intersection. $F_I$ is computed by adding all forces $F_s$ for all segments converging in an intersection. At step 529, each segment endpoint is shifted by a quantity proportional to the force applied to that point.

Steps 523–529 are repeated until the value of the largest segment shift computed in step 529 is below a predefined threshold. This threshold may be entered by a user, or may be set in an application. This gradient climbing technique guarantees that a local maxima in the probability $P_s$ for each segment is reached. However, in some situations such local maxima does not correspond to the center lane location in the aerial image. Under such circumstances, the user may manually input the correct segment endpoint locations.

At step 530, the updated street data is used to segment the image area into elementary city blocks. These blocks are considered one by one to identify and label houses in the loop that begins with step 540.

For each block, pixels are clustered into small regions of uniform color and texture, as shown by step 550. These sections of uniform color and texture may then be identified. For example, a section may be a roof, or a tree. Any method known to those skilled in the art may be used to cluster the pixels. In a preferred embodiment, the watershed segmentation algorithm may be used to perform the segmenting. As will be obvious to those skilled in the art, other algorithms may be used to segments the pixels, and it is intended that these methods come within the scope of the present invention.

In the Watershed technique, otherwise known as the Region Growing technique, the image is segmented into regions of uniform color with very strong edges. In this technique a point (or pixel) is selected to begin a "region", then the neighboring pixels are considered. The pixels that are similar in color are blended into the region. The region's neighboring pixels are considered, and any similarly colored pixels are blended into the region, and so forth. In operation, this technique works much like the Bucket Fill tool in photo editing software. This processing is performed until the entire image has been segmented into regions.

At step 560, the regions or sections are determined to either be part of a house or not be part of a house based on characteristics of the particular section, and of the area under consideration in general. These characteristics may include color, shape, area, distance from the street, and distance from the closest house. For example, it may be known that the houses in the area under consideration are all at least 15 meters from the street. This characteristic will be used to determine whether a certain section should be considered to be a house or not.

Once all blocks have been analyzed, the House Map is saved at step 580. The House Map file preferably contains a record for each pixel. In one embodiment, each pixel is assigned a code number that signals whether the pixel is part of a house or not. For example, if the value of the code number for a pixel is zero, then it is not a house. If the value of the code number for a pixel is a number other than zero, then the pixel is part of a house, and the value of the code number preferably identifies which house. In a preferred embodiment, every house in the area under consideration is identified by a number.

FIG. 6 shows the process for generating the Tree Map file. Like the House Map, this map is used by the 3-Dimensional Map creation process (FIG. 4) to label certain pixels as trees.

As shown in FIG. 6A, the aerial image is loaded at step 601. In a preferred embodiment, this is the same image that is used in the House Map creation process, although different images may be used. The process will then identify probable trees at step 610, and probable tree shadows in the image at step 620. The details for each of these steps is also shown in greater detail in FIG. 6A. Steps 610 and 620 may be performed simultaneously or in any sequential order.

As shown, the process for identifying trees in step 610 begins with a user identifying sample trees within the image at step 611. The number of trees that need to be identified varies for different regions. If all of the trees within a certain area tend to be of the same type, then only a few need to be identified. However, if many various types of trees are in the aerial image, then several of each type (color) should be identified. The user may be given any standard identification tools to identify trees in the aerial image. For example, the user may click on a tree, or draw a box around a tree. Many different methods are known to those skilled in the art, and are intended to come within the scope of the present invention.

At step 612, a Model of normalized tree color is created to determine the average tree color. This model should provide a statistical description of the tree color. That is, the model should be able to provide a statistical probability that a pixel with a certain color is a tree. In one embodiment, an average of all tree colors is used as the model. However, in areas where there are multiple types of trees, the single average color will not provide the best model. A preferred modeling technique in the present invention is a Mixture of Gaussian Distribution used in 3-dimensional color space, which is a preferred probability distribution modeling technique for modeling natural phenomena where the samples distribute in a multimodal fashion.

For example, suppose in a particular area, there are two primary types of trees—one is very light green in color and the other is very dark green. Taking an average would result in a medium green model, which would not reflect the true color of the either type of tree. The Mixture of Gaussians technique can model more accurately the way color values distribute in 3-dimensional space. Using this technique, the 3-dimensional space (hue, saturation, value) is grouped into clusters of color, where each cluster is a Gaussian model with a certain probability attached to it. In the given example, there will be two type of clusters—a light green colored cluster for one type of tree, and a dark green colored cluster for the other type of tree.

This Model is then used in step 613 to estimate the probability that a given pixel is a tree or not. The overall probability will be the linear combination of probabilities of belonging to each cluster, each weighted by the overall cluster probability. Noise is removed in step 614 by a low pass averaging.

The steps performed in step 620 are similar to the steps in step 610. First examples of tree shadows in the image are identified at 621. A Model of normalized tree shadow color is created at step 622. This Model is used to estimate the probability that a given pixel is a tree shadow or not. After determining which pixels are tree shadows, noise is removed.

At step 625, the user inputs the probable direction of the sun. In a preferred embodiment, the user determines the probable direction of the sun from the date of the year and time of day that the picture was taken, to estimate the direction. This information is typically provided by the company that provides the aerial image. In an alternative embodiment, the user can estimate the direction of the sun from the shadows on the ground in the actual picture. The shadow probability map is then updated using this information at step 626 creating a shifted tree shadow map.

Once a tree probability map and a tree shadow probability map have been created, a map that correlates the tree map and the tree shadow map is generated at step 630. At step 640, a threshold is defined for the correlation map. This threshold value may be fixed, or it may be configurable by the user. Then, at step 650, pixels that have a probability value higher than the threshold are labeled as trees. The Tree Map is saved at step 660. The format of the Tree Map file is similar to the House Map file. Each pixel is given a code number. For example, if the code number for a given pixel is 1, then the pixel has been determined to be a tree. If the code number for a given pixel is 0, then the pixel has been determined to not be a tree.

In FIG. 4, the Tree Map and the House Map files are combined to create a single City Map. The format of this file is similar. For example, each pixel in the City Map file may also be assigned a code number. In one embodiment, the pixel's code number may be 0 if the pixel is part of the terrain, −1 is the pixel is a tree, and a number from 1 to N that if the pixel is a house. In the case of house pixels, the code number also provides the identification number of the house.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of determining a possible alternative line-of-sight between a first node and a second node, wherein said nodes are located in an area for which an aerial image is available, comprising the steps of:
   (a) determining a first degree of freedom line for the first node, and a second degree of freedom line for the second node, such that each degree of freedom line is orthogonal to the straight line between the nodes;
   (a) determining a resolution of the aerial image and an alternative position data parameter;
   (b) placing the first node at a first placement that is a distance equal to the resolution in a first direction along the first degree of freedom line from the current placement of the first node, and
   (c) placing the second node at a second placement that is a distance equal to the resolution in the first direction along the second degree of freedom line from the current placement of the second node;
   (d) determining if the straight line between the first node at the first placement and the second node at the second placement is a valid, unobstructed line-of-sight;
   (e) if the straight line is a valid, unobstructed line-of-sight, saving the line-of-sight; and if the straight line is not a valid, unobstructed line-of-sight, repeating steps (c)–(e) until the first node has been moved the distance specified in the alternative position data parameter.

2. The method of claim 1, additionally comprising the step of:
   (f) if a valid, unobstructed line-of-sight is not found by moving the nodes in the first direction along the degree of freedom lines to a placement equal to the alternative position data parameter, repeating steps (c)–(e) moving the nodes in a second direction along the degree of freedom lines.

* * * * *